United States Patent Office 3,584,041
Patented June 8, 1971

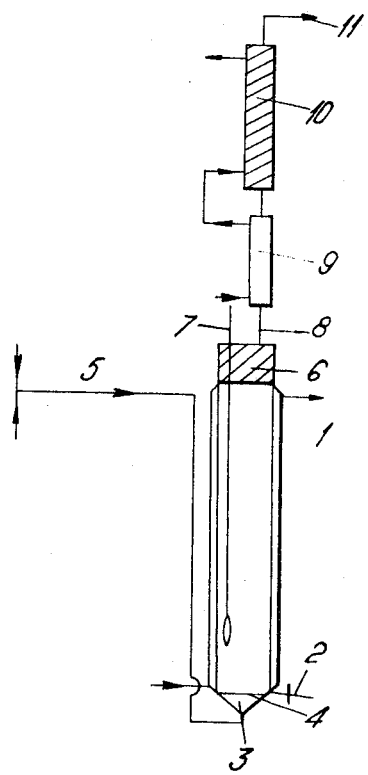

3,584,041
PROCESS FOR THE PREPARATION OF ACETIC ACID
Jacques Boichard, Bernard Brossard, Michel Gay, and Raymond Janin, Lyon, France, assignors to Rhone-Poulenc S.A., Paris, France
Filed June 21, 1967, Ser. No. 647,724
Claims priority, application France, July 12, 1966, 69,157
Int. Cl. C07c 53/08
U.S. Cl. 260—541
6 Claims

ABSTRACT OF THE DISCLOSURE

Acetic acid is produced by a two-stage process, the first stage of which is the oxidation of propylene with nitric acid and/or nitrogen peroxide, in the presence or absence of oxygen, and the second stage is the oxidation of the product of the first stage with a pentavalent vanadium compound in an aqueous acidic medium.

---

The present invention relates to the preparation of acetic acid.

The most extensively used process for making acetic acid consists of oxidising acetaldehyde continuously with oxygen or air under pressure in the presence of catalysts such as manganese acetate (Kirk-Othmer, Encyclopedia of Chemical Technology 5, pp. 393–394, second edition).

It has now been found that acetic acid may be prepared by a process which comprises (1) oxidising propylene to intermediate products, including α-nitratopripionic acid, with nitric acid and/or nitrogen peroxide, in the presence or absence of oxygen, and then (2) oxidising the product of stage (1) in an aqueous acidic medium with a pentavalent vanadium compound and optionally in the presence of an oxidising agent capable or regenerating the pentavalent vanadium compound in situ.

For the first stage of the oxidation of the propylene, either nitrogen peroxide ($N_2O_4$), optionally in the presence of oxygen, or a solution of nitrogen peroxide in nitric acid, or successively nitrogen peroxide and then nitric acid, or nitric acid alone may be used. When the propylene is oxidised by nitrogen peroxide in the presence or absence of nitric acid, or successively by nitrogen peroxide and nitric acid, an amount of nitrogen peroxide of at least 1.5 mols of $N_2O_4$ per mol of propylene, and preferably 2 mols per mol of propylene, is used and the nitric acid (if any) is employed as an aqueous solution whose $HNO_3$ concentration is at least 25%, and preferably greater than 50%, by weight.

It should be noted that, during the reaction of the nitrogen peroxide with the α-olefines which leads to the formation of nitrates of α-hydroxycarboxylic acids, unstable products may form. There is thus the risk that in certain cases uncontrollable decompositions and even explosions may occur.

If only nitric acid is used in the first stage, an acid of concentration above 50% is preferably used, employing at least 3 mols of $HNO_3$ per mol of propylene. The nitric acid concentration of the reaction medium may be kept within a suitable concentration range either purely by adding fresh nitric acid, or both by adding fresh nitric acid and by recycling the nitric acid produced by recovering the nitrous fumes formed during the reaction, or by introducing an amount of propylene insufficient to reduce the nitric acid concentration of the medium to below the selected limiting value.

No matter which oxidising agent is selected, a stream of molecular oxygen or of a gas containing molecular oxygen, such as air may be passed through the reaction mixture, with the intension of converting the nitrogen monoxide (NO) produced to nitrogen peroxide in situ. The amount of oxygen used is determined by the amount of nitrogen monoxide (NO) formed, which in turn depends on the general reaction conditions.

During this stage of the oxidation of the propylene various intermediate products are produced, among which α-nitratopropionic acid is the most important. During the second stage these intermediate products are converted into acetic acid by oxidation with a pentavalent vanadium compound, either directly in the oxidation medium resulting from the first stage, or after partial or complete elimination of the oxidising agent used in the first stage. It is also possible to oxidise pure α-nitratopropionic acid, isolated from the intermediate products formed during the first stage, with the pentavalent vanadium compound.

This second stage of the oxidation may be carried out in an aqueous medium in the presence of an inorganic or organic acid. Suitable inorganic acids are sulphuric acid, hydrochloric acid or perchloric acid. Suitable organic acids which are stable under the reaction conditions include especially acetic acid.

The concentration of these acids varies depending on the nature of the acid. Thus using sulphuric acid, the concentration in the reaction medium may range from 2 to 90%, preferably from 10 to 80% and more advantageously from 20 to 70%, expressed in weight/weight. Excessive dilution of the sulphuric acid reduces the speed of reaction and favours the formation of by-products such as formic acid.

The concentration of the intermediates arising from the first stage in the reaction medium is not critical. It is however preferable not to dilute them excessively.

The pentavalent vanadium compound used is preferably soluble or partially soluble in the reaction medium under the reaction conditions. Suitable compounds include vanadium pentoxide ($V_2O_5$), vanadium halides such as $VF_5$, vanadium oxyhalide such as $VOF_3$, $VOBr_3$ and $VOCl_3$, vanadic sulphate ($V_2O_5.2SO_3$), vanadic nitrate or phosphate, alakali metal orthovanadates ($Na_3VO_4$, $K_3VO_4$; $(NH_4)_3VO_4$); alkali metal pyrovanadates ($Na_4V_2O_7$, $K_4V_2O_7$), alkali metal metavanadates such as $LiVO_3$, $NaVO_3$ and $NH_4VO_3$; and alkali metal hexavanadates such as $Na_2O.3V_2O_5.3H_2O$.

The amount of the pentavalent vanadium compound expressed in number of equivalents of $V^{5+}$ may vary within wide limits depending on the reaction conditions. Thus, the pentavalent vanadium compound may be used at the rate of 0.001 to 5 equivalents of $V^{5+}$ per mol of propylene consumed in the first stage, or per mol of α-nitratopropionic acid employed in the second stage. Even when working without adding an oxidising agent which regenerates $V^{5+}$, a quite low amount of a $V^{5+}$ compound may be used because the oxidation of the intermediates arising from the first stage regenerates nitric acid which in turn reoxidises the $V^{4+}$ compound to $V^{5+}$ compounds. It is however in this case preferable to use more than 1 equivalent of $V^{5+}$ per mol of propylene used in the formation of the intermediate treated in the second stage; a suitable amount is between 2 and 4.5 equivalents per mol of propylene.

When a reagent capable or regenerating the $V^{5+}$ compound at the rate at which it is being reduced is introduced simultaneously with the $V^{5+}$ compound, the amount of the $V^{5+}$ compound can without disadvantage be reduced. Thus in the presence of molecular oxygen or a gas containing molecular oxygen, or in the presence of nitric acid, this quantity may be reduced to about 0.001 equivalent of $V^{5+}$ per mol of propylene employed in the preceding stage. A continuous regeneration of the pentavalent vanadium at the rate at which it is reduced to $V^{4+}$ then takes place. When oxygen (or air) is used as the reagent for regenerating the $V^{5+}$, simply passing the oxygen or air into the reaction mixture is sufficient to ensure this regeneration.

It is particularly advantageous to use nitric acid as the oxidising agent. In effect, the intermediate products arising from the first stage, regardless of how they are prepared, contain nitrc acid and/or nitrogen oxides which are converted into nitric acid when the acid solvent necessary for carrying out the second stage is added. Thus the crude products from the first stage may be directly used, after optional removal of the excess nitrogen peroxide and/or nitric acid. The amount of nitric acid required to ensure the complete regeneration of the $V^{5+}$ varies depending on the reaction conditions and especially the temperature.

If the process is not carried out in the presence of oxygen or nitric acid, the pentavalent vanadium may be regenerated subsequently by treating the reaction products with oxygen or nitric acid.

Regardless of the process used, namely in situ regeneration or subsequent regeneration, the vanadium is recovered in the pentavalent state employed initially. When nitric acid is used to regenerate the $V^{5+}$, the $HNO_3$ is reduced to $NO_2$ and $NO$, to the exclusion of any irrecoverable product such as $N_2O$ and $N_2$, and this makes it possible to regenerate $HNO_3$ by oxidising the nitrous fumes with air. The nitric acid consumption of this stage is thus nil.

The temperature at which the oxidation of the intermediates by means of $V^{5+}$ compounds is carried out may range from 20° to 115° C. and preferably 30° to 80° C., at atmospheric pressure.

The process of the present invention only consumes oxygen in the second stage. The yields of acetic acid relative to the propylene employed are, when the process is carried out under the preferred conditions, practically quantitative.

The process of the invention may be carried out continuously if the reagents used and the working conditions are chosen appropriately.

The following examples, in which the gas flow rates are expressed in rates converted to normal temperature and pressure conditions, illustrate the invention.

EXAMPLE 1

First stage

The apparatus used, which is shown in the accompanying drawing, consists of the following components: a cylindrical glass reactor 1, 235 mm. high, of 27 mm. diameter and 140 cm.³ useful volume, fitted with a double jacket and an outlet tap 2 at its bottom, a conical chamber 3 connected to the lower part of the reactor and closed off where it joins the latter by a fritted No. 3 glass plate 4 (mean pore diameter of between 15 and 40μ); an inlet tube 5 for propylene and oxygen at the apex of the conical chamber, rising laterally alongside the outer wall of the reactor and capable of being connected to a source of propylene and oxygen; a reactor top consisting of a ground stopper 6 fitted with a thermometer sleeve 7 and a tube 8 connected to a straight reflux condenser 9 which is itself topped by a coil condenser 10, both condensers being supplied with a stream of acetone cooled to —15° C. by addition of solid carbon dioxide and being intended to condense part of the nitrous fumes rising from the reactor. A current of acetone cooled so as to keep the reaction mixture at the desired temperature is also circulated through the double jacket of the reactor 1. The outlet gasses are passed through the tube 11 to a device, not shown in the drawing, comprising two absorbers containing 110 volume of hydrogen peroxide and intended to absorb the remainder of the nitrous fumes, and then to an Orsat apparatus for measuring the unconverted propylene by absorbtion in concentrated sulphuric acid.

Before starting the process, a gentle stream of oxygen is passed into the reactor 1 via inlet tube 5 to avoid any liquid entering chamber 3, and 104 g. of nitrogen peroxide previously kept liquid at 0° C. are introduced into the reactor. Propylene is then introduced via inlet tube 5 at a rate of 2.7 l./h., mixed with oxygen whose flow rate is simultaneously kept at 4.6 l./h. The temperature of the acetone circulating in the double jacket is reduced to between —8° and —11° C. to maintain a temperature of 0 to +3° C. in the reaction mixture.

The stream of propylene is stopped after 6 hours, 15 minutes, corresponding to a total of 31.6 g. of propylene (0.755 mol). No trace of propylene is observed in the effluent gases. The flow rate of oxygen is reduced to below 1 l./h. and the reaction mixture is left at between 0° and —5° C. for 15 minutes and then withdrawn from the reactor through the tap 2. The oxygen flow rate is then kept at 10 l./h. for 30 minutes to degas the apparatus and ensure recovery of the nitrous fumes.

The excess nitrogen peroxide is driven off from the withdrawn reaction mixture, which weighs 146.6 g., by degassing at a temperature of between 0 and 20° C. under reduced pressure (20 mm. Hg). 106 g. of a light yellow liquid consisting principally of α-nitratopropionic acid are thus obtained; 100 g. of the liquid contain 0.682 mol of organic acids.

Second stage

The apparatus consists of a three-necked 500 cm.³ flask fitted with a thermometer, a dropping funnel, a central stirrer, an oxygen inlet for flushing the gases above the reaction mixture, a gas outlet tube connected to two coil condensers supplied with ice-cold water and then successively to a guard bottle, an absorber bottle containing hydrogen peroxide (intended to trap the nitrous fumes coming from the reaction), a second guard bottle and a potash absorber.

0.29 g. of sodium metavanadate (0.0024 mol) and 130 cm.³ of sulphuric acid (50% weight/weight aqueous solution) are introduced into this flask. The contents of the flask are stirred and a slow stream of oxygen is continuously introduced until the sodium vanadate has dissolved. The temperature of the contents of the flask is then raised to 40° C. and 7.54 g. of the light yellow product obtained in the first stage are added over the course of 15 minutes with stirring by the dropping funnel. The dropping funnel is rinsed with 40 cm.³ of 50% sulphuric acid and the wash acid is introduced into the flask. A total of 170 cm.³ (i.e. 240 g.) of 50% sulphuric acid has thus been introduced. The amount of the product of the first stage is that obtained by the oxidation of 0.0542 mol of propylene, and the ratio of the number of equivalents of $V^{5+}$ introduced in the second stage to the number of mols of propylene used in the first stage to obtain the 7.54 g. of intermediate product is thus 0.04:1.

When the addition is complete, the temperature is raised to 60° C. and 10 g. of nitric acid (63.5% weight/weight aqueous solution, i.e. 0.101 mol of $HNO_3$) are added over the course of 45 minutes. Heating is continued while oxygen is passed over the reaction mixture for 4 hours 15 minutes. Heating is then stopped and the mixture cooled to 20° C., the sweeping with the stream of oxygen being continued for 30 minutes. A reaction mixture weighing 263 g. is thus obtained.

An aliquot part (70 g.) of the reaction mixture is steam distilled to extract the organic acids formed (acetic acid and possibly formic acid) and the aqueous distillate (1,700 cm.³) is then concentrated to 150 cm.³. The distillate does not contain formic acid, as shown by a mercuric chloride determination. The organic acidity, determined potentiometrically, corresponds to that which would be theoretically expected from the oxidation of 1 mol of propylene. That is, the distillate contains 0.054 mol of acetic acid.

This result is confirmed by determining by gas/liquid chromatography the acetic acid in another 70 g. aliquot part of the reaction mixture. As for the preceding determination, the organic acids are first isolated by steam distillation, the aqueous distillate is concentrated and treated with mercuric chloride, and the acetic acid is then extracted with diethyl ether. The extract is subjected to gas/liquid chromatography.

The yield of acetic acid based on the propylene employed in the first stage is thus 100%. The nitric acid balance of the second stage is:

|  | G. atom |
|---|---|
| Nitrogen corresponding to 7.54 g. of intermediate product | 0.054 |
| Nitrogen corresponding to the nitric acid introduced | 0.010 |
| Nitrogen determined in the mixture at the end of the reaction (Devarda method)+nitrogen determined in the hydrogen peroxide absorber flask (acidimetric determination) | 0.156 |

This balance shows that no irrecoverable nitrogen has formed.

EXAMPLES 2 TO 9

A series of experiments are carried out as in Example 1 but, in the second stage, the molar ratio of $V^{5+}$/propylene is varied and the process is carried out in the presence or absence of nitric acid or oxygen. When oxygen is used, it is introduced into the reaction mixture at a rate of 2 to 3 l./h. When nitric acid is used, the proportion by weight relative to the intermediate product is the same as in Example 1. The results obtained are given in the table below, which also shows the working conditions for the second stage.

| Example | Equiv. $V^{5+}$/ mol of $C_3H_6$ | $HNO_3$ | Oxygen | Duration | Yield of $CH_3COOH$ based on propylene, percent | Yield of HCOOH based on propylene, percent |
|---|---|---|---|---|---|---|
| 2 | 1 | No | No | 7 hrs. | 85 | 5 |
| 3 | 1 | Yes | No | 5 hrs. 40 mins. | 95 | 0 |
| 4 | 1 | No | Yes | 6 hrs. | 100 | 0 |
| 5 | 0.26 | No | No | 7 hrs. 30 mins. | 60 | 4 |
| 6 | 0.26 | Yes | No | 6 hrs. | 97 | 0 |
| 7 | 0.24 | No | Yes | 7 hrs. 30 mins. | 89 | 0 |
| 8 | 0.05 | No | Yes | 6 hrs. 30 mins. | 84 | 0 |
| 9 | 0.04 | No | Yes | 3 hrs. 50 mins. | 80 | 0 |

EXAMPLE 10

Working as in the first stage of Example 1, 205.9 g. of a light yellow liquid consisting almost exclusively of α-nitratopropionic acid are prepared from 168.5 g. of nitrogen peroxide (1.83 mols of $N_2O_4$) and 61.5 g. of propylene (1.46 mols). The product obtained has an organic acidity of 0.630 mol per 100 g.

The oxidation of this intermediate product is then carried out in the apparatus described for the second stage in Example 1, using nitrogen in place of oxygen for the flushing. 78 g. of sodium metavanadate (0.639 mol), 231.2 g. of water, and 270.3 g. of 96% strength sulphuric acid are introduced into the flask. The stirrer is started and, after the reagents have dissolved, the temperature of the contents of the flask is raised to 40° C. and a weak stream of nitrogen (flow rate 2 l./h.) is introduced. 21.7 g. of the yellow liquid obtained in the previous stage are then added over the course of 15 minutes. The dropping funnel is rinsed with 40 cm.³ of water and this rinsing water is added to the contents of the flask. The temperature is then raised to 60° C. over the course of 45 minutes and this temperature is maintained for 6 hours, 15 minutes. The reaction balance is as follows:

Amount of propylene corresponding to the intermediate used in the second stage—0.154 mol.
Molar ratio $V^{5+}/C_3H_6$—4.15:1.
Acetic acid produced—0.146 mol.
Yield of acetic acid based on propylene—95.2%.

EXAMPLES 11 TO 13

A series of experiments is carried out working as in Example 10, with the concentration of the intermediate in the medium (percent by weight), the amount of $V^{5+}$, the heating temperature after introducing the reagents, and the duration of heating being those given in the table below, which also shows the results obtained.

| Example | Concentration of intermediates in the medium, percent | Equiv. $V^{5+}$/ mols of $C_3H_6$ | T., ° C. | Duration | Yield of acetic acid based on $C_3H_6$, percent | Yield of HCOOH based on $C_3H_6$, percent |
|---|---|---|---|---|---|---|
| 11 | 1.3 | 2.2 | 80 | 4 hrs. | 90 | 0 |
| 12 | 3.2 | 4.15 | 60 | 7 hrs. 15 mins. | 95 | 0 |
| 13 | 1 | 12 | 93 | 5 hrs. | 92 | 6 |

EXAMPLES 14 TO 17

A series of experiments is carried out, working as in Example 10 but heating to various temperatures after introducing the reagents, and using the following charge: 7.5 g. of the intermediate product prepared as in Example 10, 840 cm.³ of 50% strength sulphuric acid, and 29.2 g. of sodium metavanadate (i.e. 4.5 equivalents of $V^{5+}$ per mol of propylene converted in the stage in which the intermediates are formed). The results shown in the following table are obtained:

| Example | Temperature, ° C. | Duration of reaction | Yield of acetic acid based on propylene, percent |
|---|---|---|---|
| 14 | 40 | 7 hours 30 minutes | 100 |
| 15 | 60 | 7 hours | 100 |
| 16 | 80 | 6 hours | 91.5 |
| 17 | 100 | 4 hours | 83 |

EXAMPLES 18 TO 21

A series of experiments is carried out working as in Example 10, in a 50% strength (percent by weight) sulphuric acid medium, but varying the concentration of intermediates in the medium as indicated below. The following results are obtained:

| Example | Concentration of intermediate in the medium (percent by weight) | Equiv. $V^{5+}$ per mole of propylene | Duration | Yield of acetic acid based on propylene, percent |
|---|---|---|---|---|
| 18 | 0.67 | 4.5 | 7 hours | 100 |
| 19 | 0.67 | 4.5 | 7 hours 45 min | 95 |
| 20 | 2.7 | 4.4 | 3 hours | 99 |
| 21 | 3.2 | 4.15 | 7 hours 45 min | 98 |

EXAMPLES 22 TO 25

A series of experiments is carried out in media of various sulphuric acid concentrations, the other reaction conditions being as follows: heating temperature after introducing the reagents, 60° C.; intermediate introduced, 7.5 g. of the product prepared as in Example 10; concentration by weight of the intermediate in the medium, 3.2%; number of equivalents of $V^{5+}$ per mol of propylene consumed to form the intermediate, 4.3:1. The following results are obtained:

| Ex. | Concentration of $H_2SO_4$ in the medium (percent by weight) | Duration | Yield of acetic acid based on propylene, percent | Yield of formic acid based on propylene, percent |
|---|---|---|---|---|
| 22 | 5.7 | 32 hours | 72 | 10 |
| 23 | 21 | 9 hours 30 min | 85 | 20 |
| 24 | 50 | 7 hours 15 min | 98 | 0 |
| 25 | 79 | 4 hours | 92 | 0 |

EXAMPLE 26

Example 10 is repeated, under the following reaction conditions: a temperature of 60° C.; number of equivalents of $V^{5+}$ per mol of propylene consumed is 4.4; the concentration of the intermediate in the medium is 3.15% by weight; the amount of intermediate introduced is 7.5 g. of the product prepared as in Example 10; and the acid used is 36% by weight aqueous hydrochloric acid solution. In 5 hours a 92% yield of acetic acid is obtained.

We claim:
1. Process for the preparation of acetic acid which comprises (1) oxidising propylene to α-nitratopropionic acid by contacting said propylene with nitric acid and/or nitrogen peroxide, in the presence or absence of oxygen, under conditions of temperature and time such as to ensure substantially complete oxidation of the said propylene without substantial decomposition of the α-nitratopropionic acid product, and then (2) contacting the α-nitratopropionic acid product of stage (1) at 20° to 115° C. in an aqueous acidic medium with a pentavalent vanadium compound for a time sufficient to effect oxidation of said α-nitratopropionic acid to acetic acid.

2. Process according to claim 1, in which the said aqueous acidic medium contains sulphuric acid, hydrochloric acid, perchloric acid or acetic acid.

3. Process according to claim 2, in which the said acidic medium is 10% to 80% sulphuric acid weight/weight.

4. Process according to claim 1, in which the α-nitratopropionic acid is oxidized at 30° to 80° C. at atmospheric pressure.

5. Process according to claim 1, in which the vanadium compound is sodium metavanadate.

6. Process according to claim 1, in which the said aqueous acidic medium contains, in addition to the pentavalent vanadium compound, nitric acid or oxygen to regenerate the pentavalent vanadium compound in situ.

References Cited

UNITED STATES PATENTS 3,439,029 4/1969 Brockhaus.
2,847,465 8/1958 Robertson et al.

LORRAINE A. WEINBERGER, Primary Examiner

R. KELLY, Assistant Examiner

U.S. Cl. X.R.

260—533